April 24, 1956 F. S. ACTON 2,742,935
KICK-OFF MECHANISM FOR SAWING MACHINE
Filed Nov. 9, 1954 4 Sheets-Sheet 1

INVENTOR.
FOSTER S. ACTON
BY Pennie, Edmonds, Morton,
Barrows & Taylor
ATTORNEYS

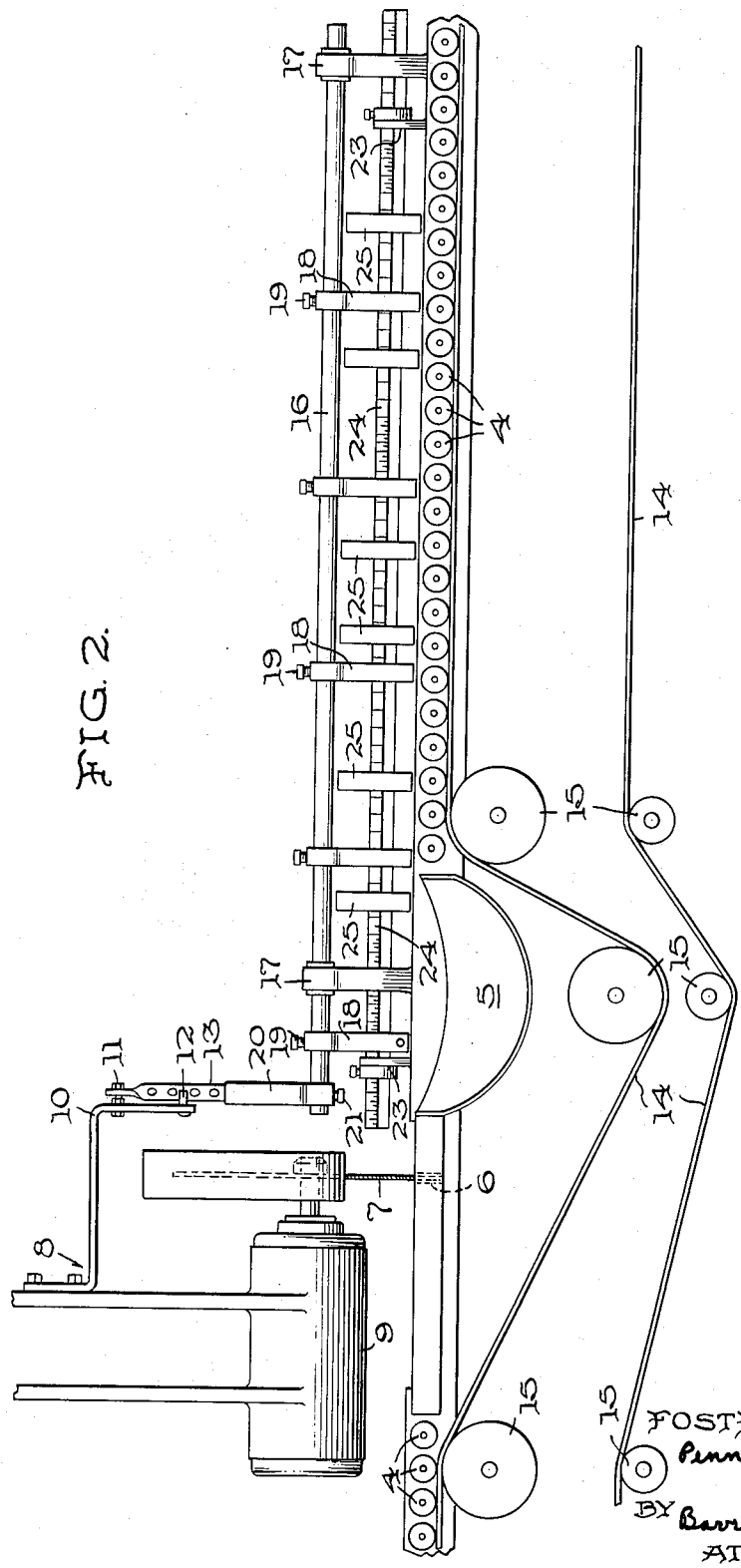

April 24, 1956 F. S. ACTON 2,742,935
KICK-OFF MECHANISM FOR SAWING MACHINE
Filed Nov. 9, 1954 4 Sheets-Sheet 3
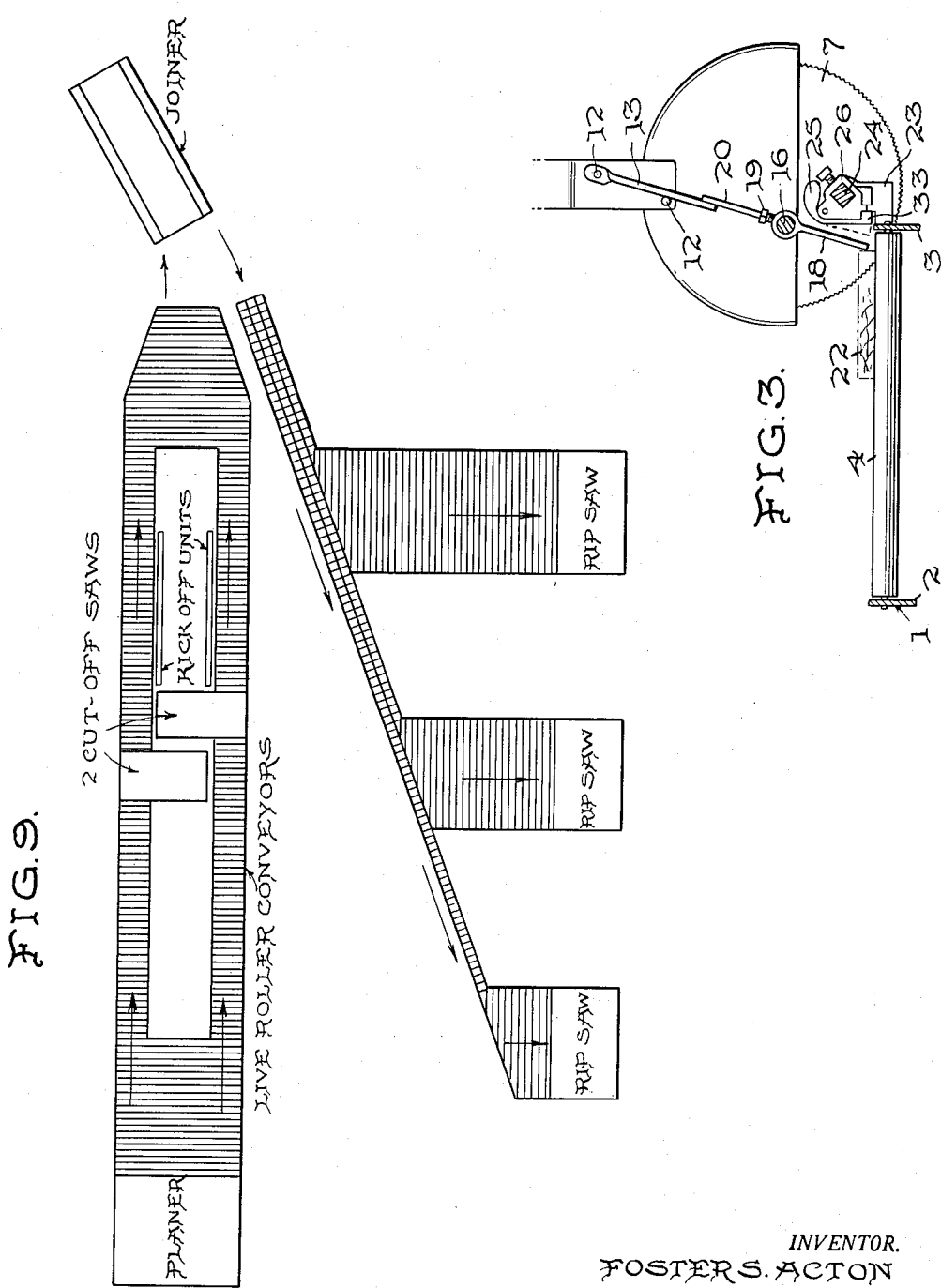
INVENTOR.
FOSTER S. ACTON
BY
Pennie, Edmonds, Morton, Barrows + Taylor
ATTORNEYS

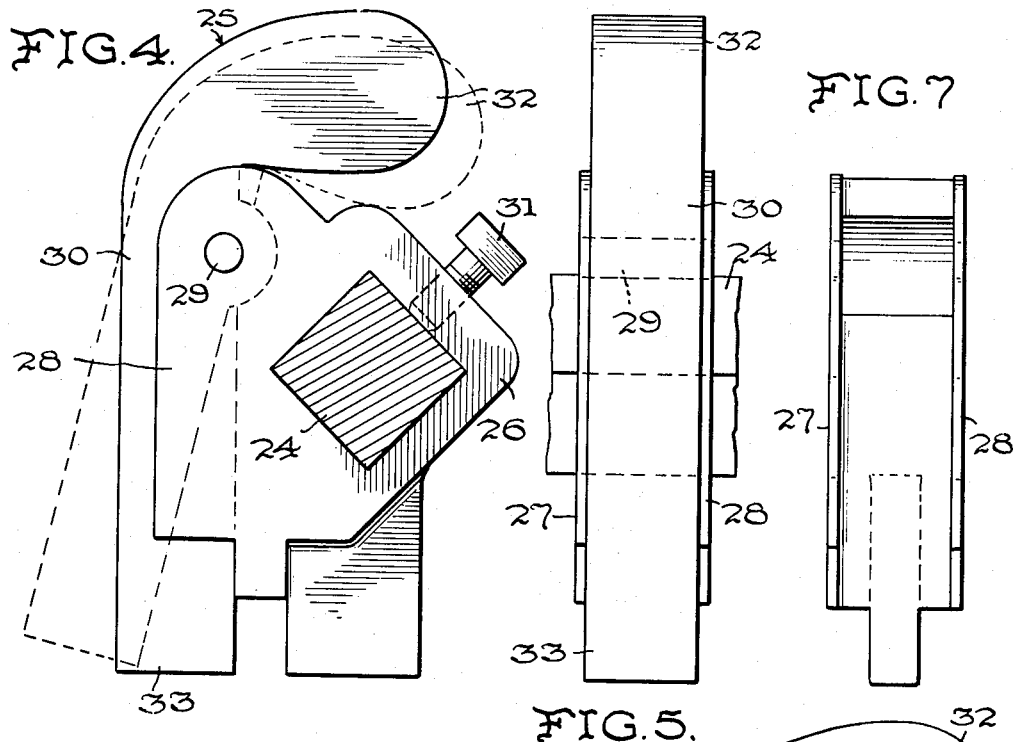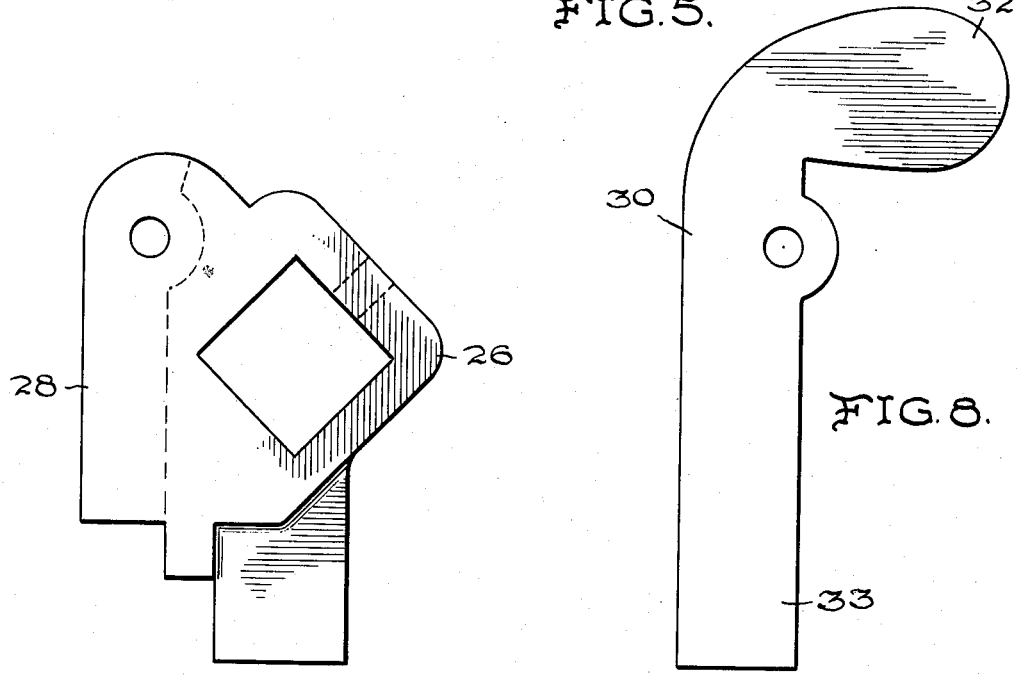

United States Patent Office 2,742,935
Patented Apr. 24, 1956

2,742,935

KICK-OFF MECHANISM FOR SAWING MACHINE

Foster Southworth Acton, New York, N. Y.

Application November 9, 1954, Serial No. 467,667

5 Claims. (Cl. 143—157)

This invention relates to an apparatus for sidewise kicking of a portion of material. The invention may be utilized on material severing machines, such as lumber sawing machines.

The invention is capable of automatically kicking a severed portion of material, such as a sawed length of lumber, sidewise on a support member so as to clear the way for the advancing length of material that is to be severed into the next length.

In the process of sawing lumber into measured lengths, the length of lumber stock is advanced past the saw beside a measuring gauge by which the operator determines the length of the sawed piece of lumber. After the saw has moved into engagement with the lumber stock and sawed a length therefrom, it has been necessary for the operator of the sawing machine to reach behind the measuring gauge and shove the sawed piece of lumber onto live rolls, making room for the advancing lumber stock. In some cases the operator is required to reach over the measuring gauge and to pick up the severed length of lumber and remove it from the path of the advancing lumber stock. This has interrupted the production of sawed lengths of lumber and has reduced the efficiency of the operator. The requirement of the prior method that the operator remove the severed length of lumber either with his hands or with some unwieldy instrument held in his hands has materially reduced production.

My invention provides a kick-off mechanism for material severing machines such as lumber sawing machines, wherein the severing device, which is alternately moved into engagement with the length of severable material and retracted from engagement with the severable material, automatically actuates the kick-off mechanism when it is retracted from engagement with the material stock. My invention provides a rotatable shaft mounted parallel and adjacent to the lumber stock supporting member. On the shaft are mounted kick-off blades which are adapted to shove the length of sawed lumber sidewise on the support member. Also mounted on the shaft is an actuating blade. Mounted on the saw is a driving member in the form of a swinging drop blade which, in a manner hereafter described, drives the actuating member upon the retraction of the saw from engagement with the lumber stock. By the provision of this kick-off mechanism, it is seen that the operator of a material severing machine, such as a lumber saw, does not need to manually remove the severed piece of lumber from its position adjacent the measuring gauge. The operator need only concern himself with the operation of the saw, for the operation of the saw automatically kicks the length of sawed lumber sidewise on the supporting member out of the way of the advancing lumber stock. Whereas heretofore the operator had to alternately operate the saw and then remove the sawed piece of lumber, now, with the use of my invention, the operator may concentrate on operating the saw. Hence, my invention eliminates 50% of the whole labor involved in severing lengths of material, such as sawing lengths of lumber. Thereby the production of sawed lumber is increased fully 50%.

Heretofore the requirement that the saw operator reach past the whirling saw blade, rotating at speeds up to 1700 R. P. M., to remove the sawed piece of lumber from adjacent the measuring gauge has created a condition hazardous to the limbs of the operator. Severing of fingers and entire hands has frequently occurred. This hazardous condition is entirely eliminated by my invention which automatically removes the sawed piece of lumber from its position adjacent the measuring gauge. Hence, the operator is not required to reach past the rapidly rotating saw blade. Thereby, my invention effects a great increase in safety of sawing operations.

An embodiment of my invention is illustrated in the accompanying drawings, wherein:

Fig. 2 is a front elevation of the lumber sawing machine illustrated in Fig. 1, wherein the saw is in the fully retracted position;

Fig. 3 is an end elevation of the kick-off portion of the device illustrated in Fig. 1, showing the saw being retracted to its retracted position and kicking the sawed board sidewise on conveyor rollers;

Fig. 4 is a side elevation of a finger-stop guide which is mounted on the measuring gauge as shown in Fig. 1;

Fig. 5 is a front elevation of the finger-stop guide illustrated in Fig. 4;

Fig. 6 shows a stop bracket which is one of the two elements which compose the finger-stop guide illustrated in Fig. 4;

Fig. 7 shows a front elevation of the stop bracket illustrated in Fig. 6;

Fig. 8 shows a side elevation of the pivoted finger-stop which is the second member composing the finger-stop guide illustrated in Fig. 4; and Fig. 9 (Sheet 3) discloses a diagrammatic view of the use of my kick-off invention in combination with a lumber saw and other woodworking devices.

Figure 1:
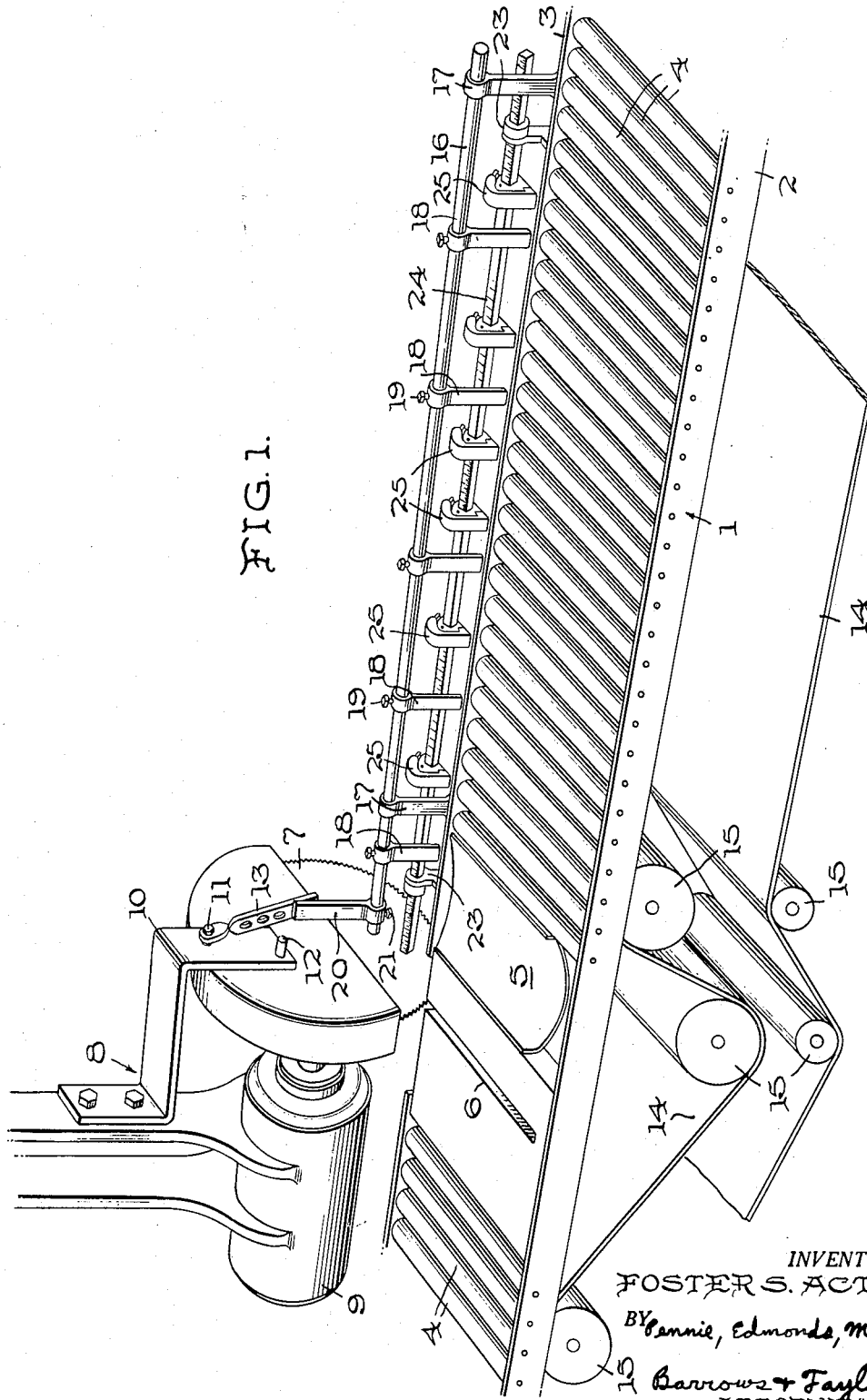
Fig. 1 is a general perspective view of a lumber sawing machine involving an embodiment of my invention.

As shown in Fig. 1, the embodiment of the invention illustrated includes a longitudinal support member or conveyor 1 for supporting and conveying lengths of lumber stock and severed portions thereof, comprising side members 2 and 3 and live rollers 4 mounted between the side members. The support member 1 has a waste chute 5 therein to receive sawdust and lumber fragments. A slot 6 in the support member 1 is adapted to receive the saw blade 7 of the saw generally designated 8. The saw 8 is driven by a motor 9 and is carried by a frame movably mounted in mountings (not shown) so as to be alternately moved laterally across the path of travel of lumber moving along support 1, into sawing engagement with the lumber stock, wherein the saw blade passes into the slot 6, and retracted from engagement with the lumber to permit the advance of the lumber stock on the support member 1. The lumber stock is advanced toward the saw from the left-hand end of the support member as seen in Fig. 1. The saw 8 has a carriage frame therefor including a bracket 10, secured to said saw, on which are mounted a pivot 11 and an abutment 12. Pivoted on the pivot 11 is a driving member in the form of a swinging drop blade 13. The abutment 12 is located so that, upon the movement of the saw into engagement with the lumber the swinging drop blade 13 swings free, but, upon the retraction of the saw 8, the swinging drop blade 13 engages the abutment 12 and is prevented from further swinging thereby.

As seen in Fig. 2, rollers 4 are driven by belts 14 which are themselves driven by rollers (not shown). Rollers 15 serve to guide and support the belt 14. Mounted adjacent and parallel to the support member 1 is a rotatable shaft 16 which is journaled in bearings 17. Kick-off blades 18 are rigidly and releasably secured to shaft 16 for rotation therewith, and are located beyond the saw 8 in the direction of the travel of lumber through the sawing machine (i. e., to the right of saw 8 as seen in Fig. 1). Set-screws 19 which screw through the hubs of kick-off blades 18 into contact with shaft 16 releasably secure the kick-off blades to the shaft. Also rigidly and releasably secured to shaft 16 is the actuating member in the form of actuating blade 20. A set-screw 21 screwed through the hub of actuating blade 20 into contact with shaft 16 releasably secures actuating blade 20 to shaft 16. As seen in Fig. 3, upon the retraction of the saw, swinging drop blade 13 is prevented from rotation in a clockwise direction by abutment 12 and rotates actuating blade 20 in a clockwise direction. Such clockwise rotation of the blade 20 through shaft 16, rotates kick-off blades 18 in a clockwise direction to shove cut board 22 (Fig. 3) sidewise.

Mounted adjacent support member 2 are measuring gauge anchor brackets 23 which are apertured to receive a measuring gauge rod 24. Rod 24 has length indicia marked thereon for determining the length of the sawed piece of lumber. Releasably mounted on rod 24 are finger stop guides 25. As seen in Figs. 4, 6 and 7 the finger stop guides are each composed of a stop bracket 26 having wings 27 and 28 thereon. Wings 27 and 28 are apertured to receive a pivot pin 29 which extends between wings 27 and 28. Pivoted on pin 29 is finger stop 30 having an enlarged upper portion 32 to serve as a counterweight for the extended lower portion 33. The fit of finger stop 30 on pin 29 is sufficiently tight that finger stop 30 remains in either the upright position shown in heavy lines in Figs. 3 and 4 or the operative position shown in dotted lines, when manually actuated to either of these positions. This effect is achieved as a result of both the balance of weights of portions 32 and 33 and the tight frictional fit of finger-stop 30 on pin 29. A set screw 31, screwed through the hub of stop bracket 26 into engagement with rod 24, releasably secures the stop bracket to the rod. When finger stop 30 is pivoted to the operative position shown in dotted lines in Figs. 3 and 4 it serves to stop the advancing lumber stock and thereby determine the length of the sawed piece of lumber. Since a plurality of finger stop guides are mounted on rod 24, boards of varying lengths may be readily sawed with high precision and accuracy.

In the operation of the sawing machine disclosed in the drawings, a length of lumber stock is passed down the support member 1 from the left, as shown in Figs. 1 and 2. The lumber stock, with the saw 8 in the retracted position shown in Figs. 1 and 2, moves over the slot 6 and down the conveyor 1 until it comes in contact with the first finger stop 30 which has been swung into the operative position shown in dotted lines in Fig. 3. Thereupon, the lumber stock jams against the operative finger stop 30 and is temporarily held against further movement along the conveyor. The saw 8 is then moved to the left, as shown in Fig. 3, so that the saw blade 7 moves into engagement with the lumber stock, passing into slot 6, and saws through the stock. As the saw 8 moves to the left, as shown in Fig. 3, in the sawing motion, the swinging drop blade 13 pivots freely about the pivot 11, and swings upwardly and to the right, as Fig. 3 is viewed, in a counter-clockwise rotation as it comes in contact with actuating blade 20, so that the swinging drop blade 13 passes over and falls on the left-hand side of actuating blade 20. When saw 8 is retracted to the right, as shown in Fig. 3, the swinging drop blade 13 is held from rotation by abutment 12 and rotates actuating blade 20 in a clockwise direction, and through shaft 16, rotates the kick-off blades 18 to kick board 22 off finger stop 30 so that it may continue its advancement along conveyor rollers 4. The mechanism is then in condition to repeat the cycle by advancing the lumber stock to the finger stop 30, moving the saw 8 into the slot 6 to saw the lumber, and retracting the saw 8 to effect kick-off of the sawed piece of lumber from the finger stop 30.

In Fig. 9 a diagrammatic showing of the kick-off mechanism in combination with other woodworking devices is depicted. The lumber stock passes from the planer via the live roller conveyors to the cut-off saws and kick-off units. The sawed lengths of lumber are then passed to the jointer wherein the lengths may be edge-joined in a manner known to the art. The joined assembly may then be passed to the ripsaw where it is ripped to desired widths according to known procedures.

While I have described my invention as embodied in a lumber sawing machine, it is applicable to any material severing device. The kick-off mechanism itself is applicable wherever sidewise kicking of material is desired.

Although I have described a specific embodiment of my invention, this is by way of illustration and not by way of limitation, as my invention is limited only by the scope of the subjoined claims.

I claim:

1. A sawing machine comprising a longitudinal support along which material to be sawed is adapted to be advanced, a frame, a saw carried by the frame, means for moving the frame to cause the saw to move laterally across the path of travel of material moving along said support for sawing such material and to be retracted, a kick-off member adjacent the support located beyond the saw in the direction of the path of travel of material through the machine and movable into the path of travel of material on the support to kick a sawed portion of material sidewise relative to the support, an actuating member operatively connected to the kick-off member to cause said movement of the kick-off member, a mechanical driving member mounted on and movable with the saw frame as the saw frame moves laterally of said support to carry the saw into and out of engagement with the material to be sawed, said driving member being so mounted on the saw frame as to mechanically engage and actuate said actuating member upon retraction of the saw to cause the kick-off member to kick a sawed portion of the material sidewise relative to the support.

2. A sawing machine according to claim 1 including a rod mounted adjacent and substantially parallel to said support, a stop bracket releasably secured to said rod, a finger stop pivotally mounted on said stop bracket and movable to a position over the support to stop the advancing material to be sawed and thereby determine the length of the portion.

3. A sawing machine comprising a longitudinal support along which material to be sawed is adapted to be advanced, a frame, a saw carried by the frame, means for moving the saw frame forwardly to cause the saw to move laterally across the path of travel of material moving along the support for sawing such material and to be retracted, a rotatable shaft mounted adjacent and extending lengthwise of the support, a kick-off member non-rotatably secured to said shaft and extending from said shaft to adjacent the support and located beyond the saw in the direction of the path of travel of material through the machine, said kick-off member being movable into the path of travel of material on the support to kick a sawed portion of material sidewise relative to the support, an actuating member non-rotatably secured to said shaft, a swinging drop-blade pivotally mounted on the saw frame and movable with the saw frame so as to contact the actuating member as the saw frame moves the saw into and out of contact with the material to be sawed, an abutment mounted on the side of the drop-blade nearest the support and limiting movement of the drop-blade in the direction opposite to the movement of the saw frame as the frame is retracted, whereby, upon forward movement of said saw, the drop-blade freely swings over the actuating member, and upon said retraction of the saw, the drop-blade is held rigid by the abutment and mechanically engages and rotates the actuating member to cause the kick-off member to kick a sawed portion of material sidewise relative to the support.

4. A sawing machine comprising a longitudinal support along which material to be sawed is adapted to be advanced, a frame, a saw carried by the frame, means for moving the saw frame forwardly to cause the saw to move laterally across the path of travel of material moving along the support for sawing such material and to be retracted, a rotatable shaft mounted adjacent and extending lengthwise of the support, a plurality of kick-off blades non-rotatably secured to said shaft and spaced lengthwise of said shaft, the kick-off blades extending downwardly from said shaft to adjacent the support and located beyond the saw in the direction of the path of travel of material through the machine, said kick-off blades being movable in unison into the path of travel of material on the support to kick a sawed portion of material sidewise relative to the support, an actuating member non-rotatably secured to said shaft, a swinging drop-blade pivotally mounted on the saw frame and movable with the saw frame so as to contact the actuating member during the forward and retraction movements of the saw frame, an abutment mounted on the side of the drop-blade nearest the support and limiting movement of the drop-blade in the direction opposite to the movement of the saw frame as the frame is retracted, whereby upon the forward movement of said saw, the drop-blade freely swings over the actuating member, and upon said retraction of the saw, the drop-blade is held rigid by the abutment and mechanically engages and moves the actuating member to cause the kick-off blades to kick a sawed portion of material sidewise relative to the support.

5. A sawing machine according to claim 4 including a rod mounted substantially parallel to and adjacent the support, a plurality of stop brackets releasably mounted on said rod and adjustable lengthwise of said rod, finger stops pivotally mounted in each of the stop brackets and individually movable to a position over the support to stop the advancing material to be sawed and thereby determine the length of the portion to be sawed.

References Cited in the file of this patent
UNITED STATES PATENTS

| | | |
|---|---|---|
| 296,334 | Jones | Apr. 8, 1884 |
| 581,531 | Bodin | Apr. 27, 1897 |
| 621,488 | Clarke | Mar. 21, 1899 |
| 752,440 | Davies | Feb. 16, 1904 |
| 1,805,856 | Streit et al. | May 19, 1931 |
| 2,149,430 | Fleming | Mar. 7, 1939 |
| 2,663,330 | Hill | Dec. 22, 1953 |